United States Patent
Akiyama et al.

(10) Patent No.: US 12,553,365 B2
(45) Date of Patent: Feb. 17, 2026

(54) CASING FOR ROTATING MACHINE, ROTATING MACHINE, AND METHOD FOR PRODUCING CASING FOR ROTATING MACHINE

(71) Applicant: MITSUBISHI HEAVY INDUSTRIES ENGINE & TURBOCHARGER, LTD., Sagamihara (JP)

(72) Inventors: Youji Akiyama, Sagamihara (JP); Nariaki Seike, Almere (NL); Takuya Ehana, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/287,387

(22) PCT Filed: Jun. 21, 2022

(86) PCT No.: PCT/JP2022/024634
§ 371 (c)(1),
(2) Date: Oct. 18, 2023

(87) PCT Pub. No.: WO2022/270485
PCT Pub. Date: Dec. 29, 2022

(65) Prior Publication Data
US 2024/0209753 A1 Jun. 27, 2024

(30) Foreign Application Priority Data
Jun. 24, 2021 (JP) .................. 2021-105098

(51) Int. Cl.
*F01D 25/24* (2006.01)
*F01D 11/00* (2006.01)
(Continued)

(52) U.S. Cl.
CPC ........ *F01D 25/243* (2013.01); *F05D 2230/13* (2013.01); *F05D 2250/60* (2013.01); *F05D 2260/31* (2013.01)

(58) Field of Classification Search
CPC ...... F01D 25/243; F01D 25/16; F01D 11/005; F02B 39/00; F02D 9/1035
See application file for complete search history.

(56) References Cited

U.S. PATENT DOCUMENTS

2010/0236513 A1 9/2010 Lohr
2010/0296925 A1* 11/2010 Sakai .................... F01D 25/243
415/214.1
(Continued)

FOREIGN PATENT DOCUMENTS

CN 105658929 A * 6/2016 ............. F01D 9/026
CN 109964014 A * 7/2019 ............. B21D 39/06
(Continued)

OTHER PUBLICATIONS

English translation of JP2012159169 by PE2E Apr. 13, 2024.*
(Continued)

*Primary Examiner* — Deming Wan
(74) *Attorney, Agent, or Firm* — Birch, Stewart, Kolasch & Birch, LLP

(57) ABSTRACT

A casing that is for a rotating machine and that is configured such that a plurality of housings are linked together, the casing comprising: a first housing including a first connection part that protrudes outward in a radial direction of the rotating machine and that has a first surface extending along the radial direction; a second housing including a second connection part that protrude outward in the radial direction and that has a second surface extending along the radial direction and being in contact with the first surface; and at least one fastening device that fastens the first connection part and the second connection part in the axial direction of
(Continued)

the rotating machine, wherein at least one of the first surface or the second surface includes, at least at a portion thereof, a rough surface region having formed therein a plurality of laser irradiation marks formed by irradiation with laser light.

10 Claims, 10 Drawing Sheets

(51) Int. Cl.
    *F01D 25/16*     (2006.01)
    *F02B 39/00*     (2006.01)
    *F02D 9/10*     (2006.01)

(56) References Cited

U.S. PATENT DOCUMENTS

| | | |
|---|---|---|
| 2015/0285134 A1 | 10/2015 | Palko |
| 2018/0087531 A1 | 3/2018 | Weisbrod et al. |
| 2019/0003337 A1 | 1/2019 | Strauss |
| 2019/0234238 A1 | 8/2019 | Kojima et al. |
| 2020/0123931 A1 | 4/2020 | Watanabe et al. |

FOREIGN PATENT DOCUMENTS

| | | | | |
|---|---|---|---|---|
| DE | 10 2014 113 165 A1 | 3/2016 | | |
| DE | 10 2016 117 960 A1 | 3/2016 | | |
| JP | 54-143916 U | 10/1979 | | |
| JP | 2009-243299 A | 10/2009 | | |
| JP | 2011-58525 A | 3/2011 | | |
| JP | 2012159169 A | * 8/2012 | ............. | F16B 37/00 |
| JP | 2019-505724 A | 2/2019 | | |
| JP | 2019-183902 A | 10/2019 | | |
| JP | 2021-89011 A | 6/2021 | | |
| WO | WO 2017/168767 A1 | 10/2017 | | |
| WO | WO 2018/092781 A1 | 5/2018 | | |

OTHER PUBLICATIONS

English translation of CN 105658929 by PE2E Apr. 13, 2024.*
English translation of CN109964014 by PE2E.*
German Office Action for German Application No. 11 2022 001 275.7, dated Apr. 29, 2024.
International Preliminary Report on Patentability and Written Opinion of the International Searching Authority for International Application No. PCT/JP2022/024634, dated Jan. 4, 2024, with an English translation.
International Search Report for International Application No. PCT/JP2022/024634, dated Aug. 16, 2022.

* cited by examiner

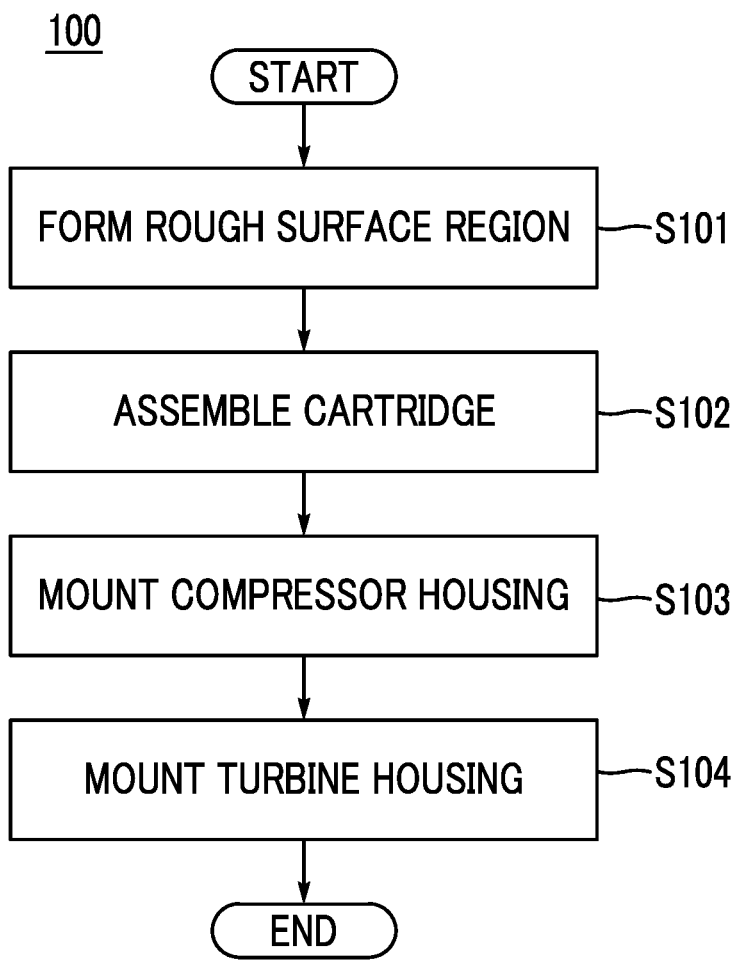

us 12,553,365 B2

CASING FOR ROTATING MACHINE, ROTATING MACHINE, AND METHOD FOR PRODUCING CASING FOR ROTATING MACHINE

TECHNICAL FIELD

The present disclosure relates to a casing for a rotating machine, a rotating machine, and a method for producing a casing for a rotating machine.

The present application claims priority based on Japanese Patent Application No. 2021-105098 filed in Japan on Jun. 24, 2021, the contents of which are incorporated herein by reference.

BACKGROUND ART

As a rotating machine, a turbine, an electric motor, a pump, an engine, a turbocharger, and the like are known. Such a rotating machine generally is provided with a casing in which a plurality of housings are fastened.

For example, PTL 1 discloses a turbocharger provided with a center housing accommodating a bearing that rotatably supports a turbine shaft, a turbine housing accommodating a turbine impeller linked to one end side of the turbine shaft, and a compressor housing accommodating a compressor impeller linked to the other end side of the turbine shaft. The center housing is disposed between the turbine housing and the compressor housing, and is linked to the turbine housing or the compressor housing via a fastening device such as a fastening bolt or a coupling (V-clamp).

Citation List

Patent Literature

[PTL 1] Japanese Unexamined Patent Application Publication No. 2009-243299

SUMMARY OF INVENTION

Technical Problem

In the turbocharger as described in PTL 1, in a case where a positional deviation occurs between the housings, an adverse effect such as a malfunction of an actuator in which at least a part thereof is accommodated in the housing may occur. As means for suppressing the positional deviation between the housings, it is conceivable to suppress rotation of the housings by means of a positioning pin. However, the positioning pin has little effect of suppressing the positional deviation between the housings, and the positional deviation between the housings may occur due to wear or damage of the positioning pin.

Further, as the means for suppressing the positional deviation between the housings, it is conceivable to increase a friction coefficient of an abutment part between the housings. In a case where an undulation is formed in the abutment part by a knurling process using a lathe to prevent slipping, the accuracy of forming the undulation may be low, and the friction coefficient of the abutment part may be reduced.

In view of the above circumstances, an object of at least one embodiment of the present disclosure is to provide a casing for a rotating machine, a rotating machine, and a method for producing a casing for a rotating machine capable of suppressing a positional deviation between housings.

Solution to Problem

A casing for a rotating machine according to an embodiment of the present disclosure is
  a casing for a rotating machine configured such that a plurality of housings are linked to each other, the casing for a rotating machine including
  a first housing that includes a first connection part having a first surface extending along a radial direction of the rotating machine,
  a second housing that includes a second connection part having a second surface extending along the radial direction and being in contact with the first surface, and
  at least one fastening device that fastens the first connection part and the second connection part in an axial direction of the rotating machine,
  in which at least one of the first surface or the second surface includes, in at least a part of the first surface or the second surface, a rough surface region in which a plurality of laser irradiation marks formed by irradiation with laser light are formed.

A rotating machine according to an embodiment of the present disclosure includes
  the casing, and
  an impeller that is rotatably accommodated in the casing.

A method for producing a casing for a rotating machine according to an embodiment of the present disclosure is
  a method for producing a casing for a rotating machine configured such that a plurality of housings are linked to each other, the plurality of housings including
  a first housing that includes a first connection part having a first surface extending along a radial direction of the rotating machine, and
  a second housing that includes a second connection part having a second surface extending along the radial direction and being in contact with the first surface,
  the method for producing a casing for a rotating machine including
  a rough surface region forming step of irradiating at least one of the first surface or the second surface with laser light to form a rough surface region including a plurality of laser irradiation marks.

Advantageous Effects of Invention

According to at least one embodiment of the present disclosure, there is provided the casing for a rotating machine, the rotating machine, and the method for producing a casing for a rotating machine capable of suppressing the positional deviation between the housings.

BRIEF DESCRIPTION OF DRAWINGS

FIG. 11 is a flow chart for describing a method for producing the casing for the rotating machine according to an embodiment of the present disclosure.

DESCRIPTION OF EMBODIMENTS

Figure 1:
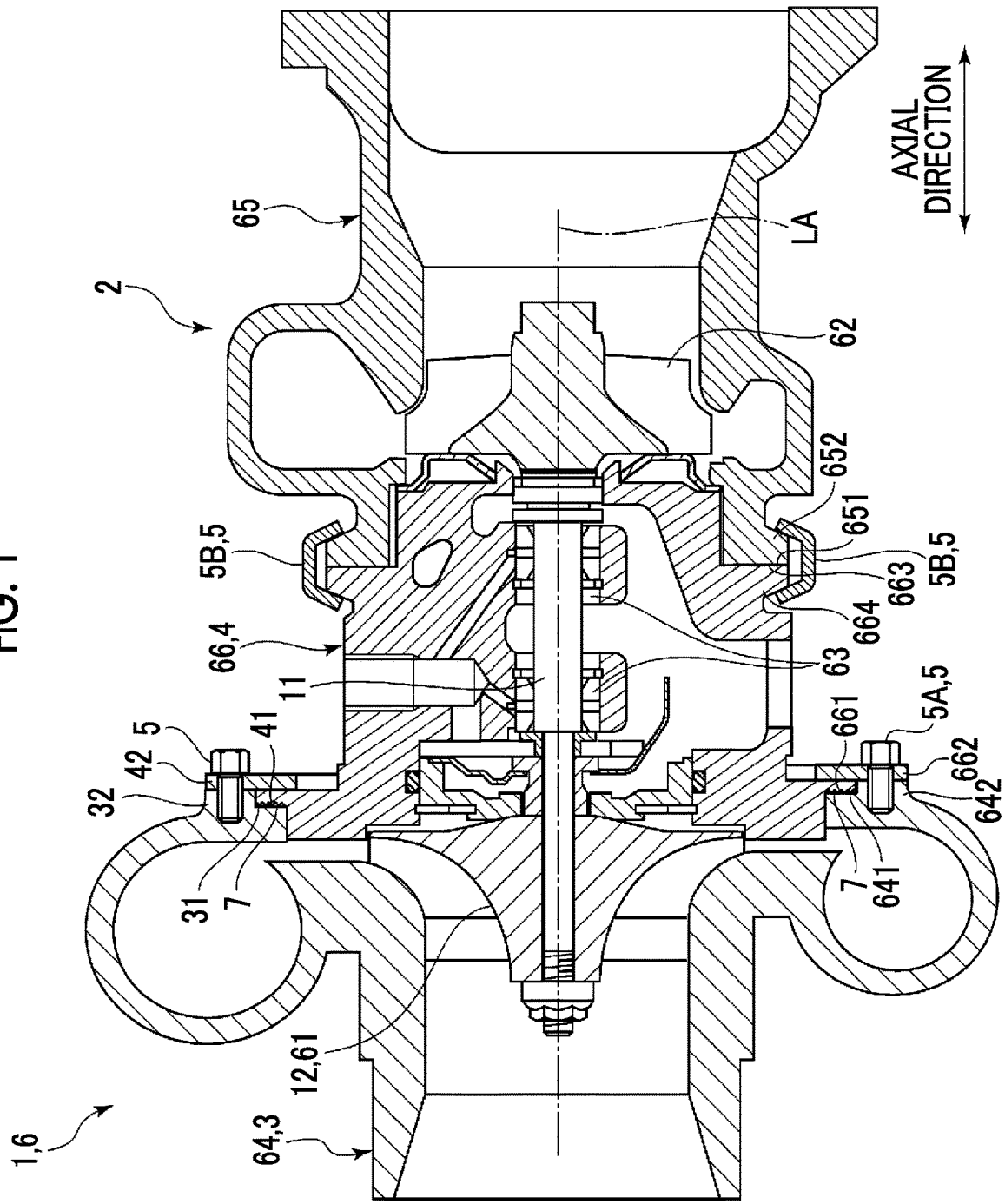
FIG. 1 is a schematic cross-sectional view of a rotating machine according to an embodiment of the present disclosure.

Hereinafter, some embodiments of the present disclosure will be described with reference to the accompanying drawings. However, dimensions, materials, shapes, relative dispositions, and the like of components, which are described as the embodiments or shown in the drawings, are not intended to limit the scope of the present disclosure and are merely explanatory examples.

For example, expressions such as "in a certain direction", "along a certain direction", "parallel", "orthogonal", "center", and "concentric" or "coaxial", which represent relative or absolute dispositions, not only strictly represent such a disposition but also represent a state of relative displacement with a tolerance or at an angle or distance to the extent that the same function can be obtained.

For example, expressions such as "identical", "equal", and "homogeneous", which represent that things are in an equal state, not only strictly represent the equal state but also represent a state where a tolerance or a difference to the extent that the same function can be obtained is present.

For example, an expression representing a shape such as a quadrangular shape or a cylindrical shape not only represents a shape such as a quadrangular shape or a cylindrical shape in a geometrically strict sense but also represents a shape including an undulating portion, a chamfering portion, or the like within a range where the same effect can be obtained.

Meanwhile, an expression of "provided with", "including", or "having" one component is not an exclusive expression excluding the presence of other components.

The same reference numerals may be assigned to the same configurations, and description thereof may be omitted.

(Rotating Machine)

FIG. 1 is a schematic cross-sectional view of a rotating machine according to an embodiment of the present disclosure. As shown in FIG. 1, a rotating machine 1 is provided with a rotating shaft 11, an impeller 12 attached to the rotating shaft 11, and a casing 2 configured to accommodate the impeller 12. Hereinafter, a direction in which an axis line LA of the rotating shaft 11 (axis line of the rotating machine 1) extends (left-right direction in FIG. 1) is defined as an axial direction of the rotating machine 1. Each of a radial direction and a circumferential direction of the rotating machine 1 is defined with reference to the axial direction.

The casing 2 is configured such that a plurality of housings (a first housing 3, a second housing 4, and the like) are linked in the axial direction. As shown in FIG. 1, the casing 2 is provided with the first housing 3, the second housing 4, and at least one fastening device 5 that fastens the first housing 3 and the second housing 4. The first housing 3 includes a first connection part 32 having a first surface 31 extending along the radial direction of the rotating machine 1. The second housing 4 includes a second connection part 42 having a second surface 41 extending along the radial direction of the rotating machine 1 and being in contact with the first surface 31. The second connection part 42 is disposed adjacent to the first connection part 32 in the axial direction of the rotating machine 1.

The at least one fastening device 5 is configured to fasten the first connection part 32 and the second connection part 42 in the axial direction. With the fastening of the first connection part 32 and the second connection part 42 in the axial direction via the fastening device 5, the first housing 3 and the second housing 4 are fastened in the axial direction. In a case where the first connection part 32 and the second connection part 42 are fastened in the axial direction via the fastening device 5, the first surface 31 and the second surface 41 are brought into close contact with each other due to fastening strength generated by the fastening device 5, and a frictional resistance against a positional deviation is generated between the first surface 31 and the second surface 41.

(Turbocharger)

In the illustrated embodiment, the rotating machine 1 is composed of a turbocharger 6 for an automobile. The turbocharger 6 is provided with the rotating shaft 11, a compressor impeller 61 which is the impeller 12 attached to one side of the rotating shaft 11, a turbine blade 62 attached to the other side of the rotating shaft 11, a bearing 63 that rotatably supports the rotating shaft 11, and the casing 2 that accommodates the rotating shaft 11, the compressor impeller 61, the turbine blade 62, and the bearing 63.

The casing 2 of the turbocharger 6 is provided with a compressor housing 64 configured to accommodate the compressor impeller 61, a turbine housing 65 configured to accommodate the turbine blades 62, a center housing 66 configured to accommodate the bearing 63, and the at least one fastening device 5. The center housing 66 is disposed between the compressor housing 64 and the turbine housing 65 in the axial direction of the rotating machine 1.

As shown in FIG. 1, the compressor housing 64 includes a compressor-side connection part 642 having a compressor-side surface 641 extending along the radial direction of the rotating machine 1. The center housing 66 includes a first-center-side connection part 662 having a first-center-side surface 661 extending along the radial direction of the rotating machine 1 and being in contact with the compressor-side surface 641. The at least one fastening device 5 includes a fastening device 5A on a compressor side that fastens the compressor-side connection part 642 and the first-center-side connection part 662 in the axial direction. With the fastening of the compressor-side connection part 642 and the first-center-side connection part 662 via the fastening device 5A, the compressor housing 64 and the center housing 66 are fastened in the axial direction. In a case where the compressor-side connection part 642 and the first-center-side connection part 662 are fastened via the fastening device 5A, the compressor-side surface 641 and the first-center-side surface 661 are brought into close contact with each other due to the fastening strength generated by the fastening device 5A, and the frictional resistance against the positional deviation is generated between the compressor-side surface 641 and the first-center-side surface 661.

As shown in FIG. 1, the turbine housing 65 includes a turbine-side connection part 652 having a turbine-side surface 651 extending along the radial direction of the rotating machine 1. The center housing 66 includes a second-center-side connection part 664 having a second-center-side surface 663 extending along the radial direction of the rotating machine 1 and being in contact with the turbine-side surface 651. The at least one fastening device 5 includes a fastening device 5B on a turbine side that fastens the turbine-side connection part 652 and the second-center-side connection part 664 in the axial direction. With the fastening of the turbine-side connection part 652 and the second-center-side connection part 664 via the fastening device 5B, the turbine housing 65 and the center housing 66 are fastened in the axial direction. In a case where the turbine-side connection part 652 and the second-center-side connection part 664 are fastened via the fastening device 5B, the turbine-side surface 651 and the second-center-side surface 663 are brought into close contact with each other due to the fastening strength generated by the fastening device 5B, and the frictional resistance against the positional deviation is generated between the turbine-side surface 651 and the second-center-side surface 663.

The first housing 3 may be one of the compressor housing 64 or the center housing 66, and the second housing 4 may be the other of the compressor housing 64 or the center housing 66. Further, the first housing 3 may be one of the turbine housing 65 or the center housing 66, and the second housing 4 may be the other of the turbine housing 65 or the center housing 66.

(Rough Surface Region)

At least one of the first surface 31 or the second surface 41 includes a rough surface region 7 in at least a part thereof. In the embodiment shown in FIG. 1, the rough surface region 7 is formed on the second surface 41, but may be formed on the first surface 31 or on both the first surface 31 and the second surface 41. As shown in FIG. 1, the rough surface region 7 may be provided on at least one of the surface 641 or the surface 661 where the compressor housing 64 and the center housing 66 are in contact with each other, or may be provided on at least one of the surface 651 or the surface 663 where the turbine housing 65 and the center housing 66 are in contact with each other.

Figure 2:
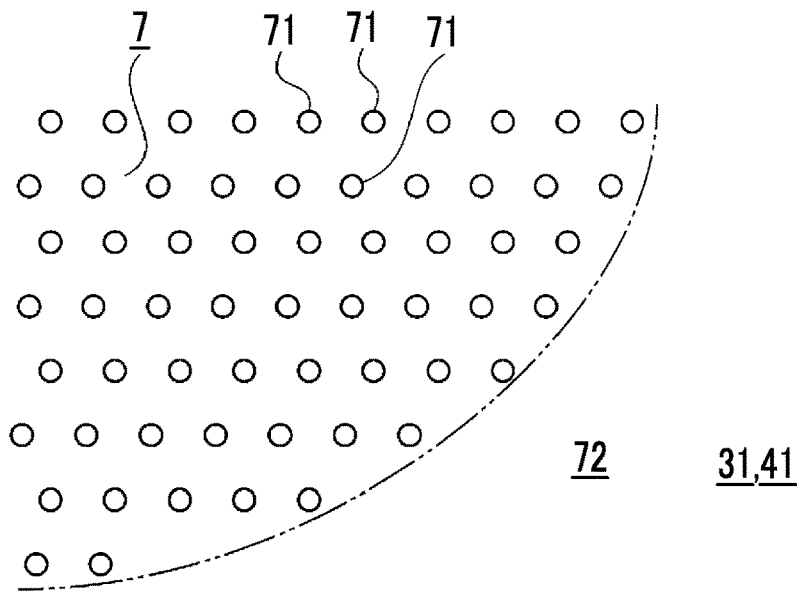
FIG. 2 is an explanatory diagram for describing a rough surface region.
Figure 3:
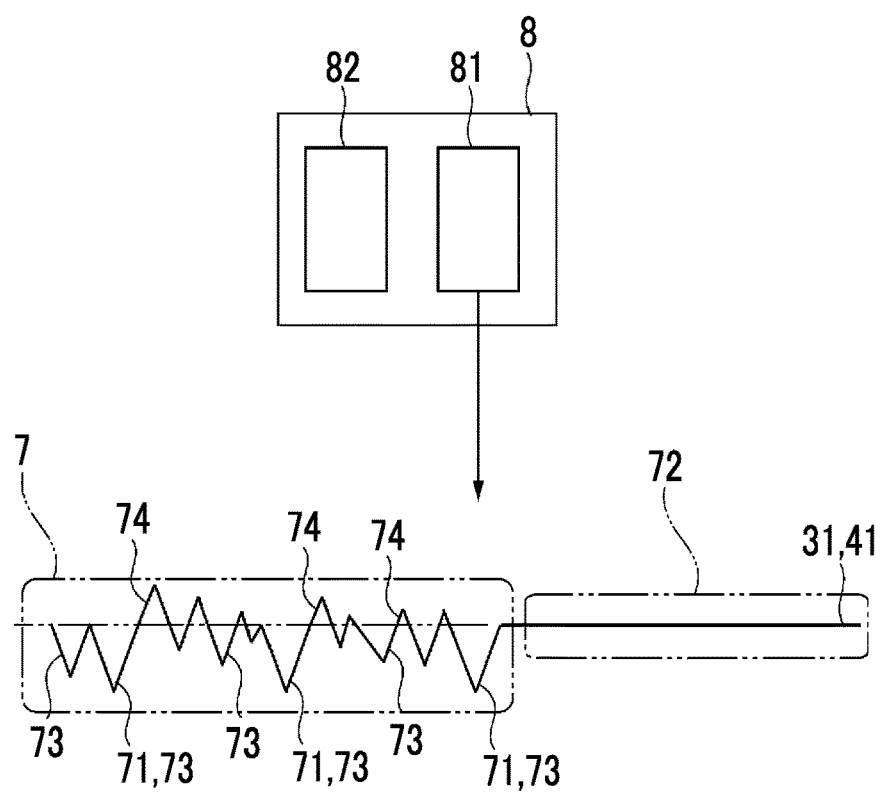
FIG. 3 is an explanatory diagram for describing a surface shape of the rough surface region.

FIG. 2 is an explanatory diagram for describing the rough surface region. FIG. 3 is an explanatory diagram for describing a surface shape of the rough surface region. As shown in FIG. 2, a plurality of laser irradiation marks 71 formed by irradiation with laser light are formed in the rough surface region 7. The plurality of laser irradiation marks 71 are formed at positions separated from each other in the rough surface region 7. The plurality of laser irradiation marks 71 are disposed in parallel at spacings from each other along a direction in which a laser irradiation target position moves. As illustrated, the plurality of laser irradiation marks 71 may be disposed in a staggered manner in the rough surface region 7 or may be disposed in parallel along two directions orthogonal to each other in the rough surface region 7. A region 72 in FIGS. 2 and 3 indicates a region that is not irradiated with the laser light.

In the illustrated embodiment, the plurality of laser irradiation marks 71 are formed by the laser light emitted from a laser marker device 8. A laser light output of the laser marker device 8 is 100 W or less. An example of the laser marker device 8 includes a device used for irradiating the laser light to imprint on an object. In the embodiment shown in FIG. 3, the laser marker device 8 includes a laser light irradiation unit 81 configured to irradiate the laser irradiation target position with the laser light (for example, pulse laser) and an irradiation position adjustment unit 82 configured to adjust the laser irradiation target position. An output of the laser light emitted from the laser light irradiation unit 81 may be fixed to a predetermined value.

In the illustrated embodiment, each of the plurality of laser irradiation marks 71 has a diameter of 10 to 100 μm. Each of the plurality of laser irradiation marks 71 has a depth of 10 to 100 μm with reference to the region 72. Each of the plurality of laser irradiation marks 71 is formed at a position 10 to 100 μm away from other laser irradiation marks 71.

As shown in FIG. 3, the rough surface region 7 has a plurality of recessed portions 73 and a plurality of convex portions 74. The plurality of recessed portions 73 and the plurality 4 convex portions 74 are formed by the irradiation with the laser light for forming the plurality of laser irradiation marks 71. For this reason, at least a part of the plurality of recessed portions 73 is composed of the laser irradiation mark 71. In the illustrated embodiment, each of the plurality of convex portions 74 has a depth of 0 to 100 μm with respect to the region 72. As shown in FIG. 3, surface roughness of the rough surface region 7 is larger than that of the region 72 not irradiated with the laser light.

The casing 2 of the rotating machine 1 according to some embodiments is provided with the first housing 3 including the first connection part 32 having the first surface 31, the second housing 4 including the second connection part 42 having the second surface 41, and the at least one fastening device 5. At least one of the first surface 31 or the second surface 41 includes, in at least a part thereof, the rough surface region 7 in which the plurality of laser irradiation marks 71 formed by the irradiation with the laser light are formed.

With the above configuration, since the rough surface region 7 has an undulation (recessed portions 73 and convex portions 74) formed by the irradiation with the laser light, the rough surface region 7 has a rough surface and a large friction coefficient as compared with the region 72 not irradiated with the laser light. With the providing of the rough surface region 7 having the large friction coefficient on the first surface 31 or the second surface 41, it is possible to increase the frictional resistance between the first surface 31 and the second surface 41. Further, with the providing of the rough surface region 7 on the first surface 31 or the second surface 41, it is possible to enhance adhesiveness between the first surface 31 and the second surface 41. Accordingly, it is possible to suppress the positional deviation between the first housing 3 and the second housing 4.

With the suppression of the positional deviation between the first housing 3 and the second housing 4, it is possible to suppress a malfunction of an actuator in which at least a part thereof is accommodated in the casing 2, and thus, to improve the reliability of the rotating machine 1.

In some embodiments, the plurality of laser irradiation marks 71 described above are formed by the laser light emitted from the laser marker device 8 having the laser light output of 100 W or less.

With the above configuration, the rough surface region 7 having appropriate surface roughness is formed by irradiating the first surface 31 or the second surface 41 with the laser light having the output of 100 W or less. With the providing of the rough surface region 7 on the first surface 31 or the second surface 41, it is possible to effectively improve the frictional resistance and the adhesiveness between the first surface 31 and the second surface 41. Accordingly, it is possible to effectively suppress the positional deviation between the first housing 3 and the second housing 4. Further, since the laser marker device 8 having the laser light output of 100 W or less is cheaper than a laser light irradiation device having a laser light output of more than 100 W, it is possible to suppress an increase in equipment costs. In some other embodiments, the plurality of laser irradiation marks 71 may be formed by laser light emitted from the laser light irradiation device having the laser light output of more than 100 W.

(Bolt Fastening Structure Between Housings)

Figure 4:
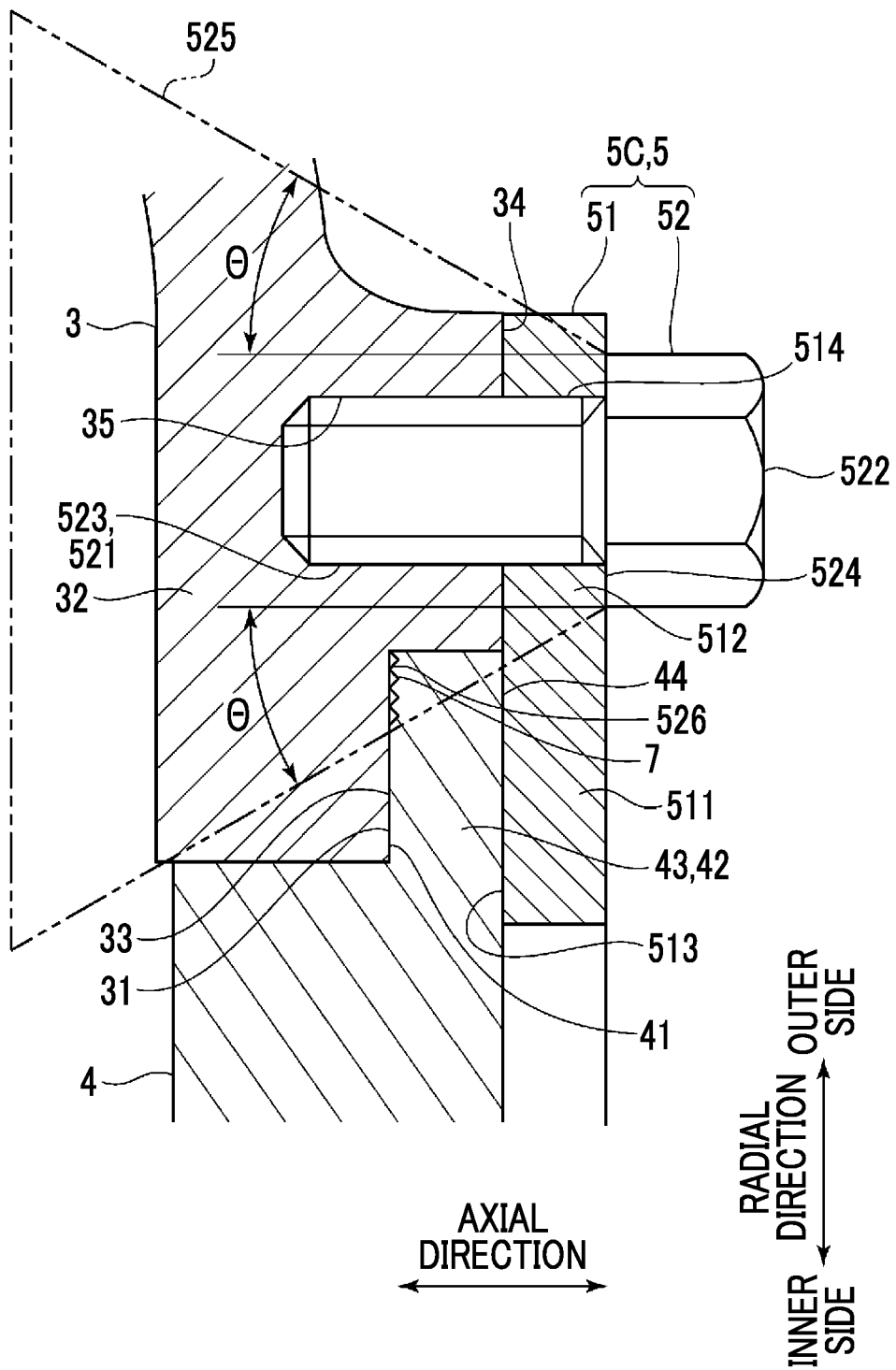
FIG. 4 is a schematic cross-sectional view of the vicinity of a fastening part between a first housing and a second housing in a casing for the rotating machine according to an embodiment of the present disclosure.
Figure 5:
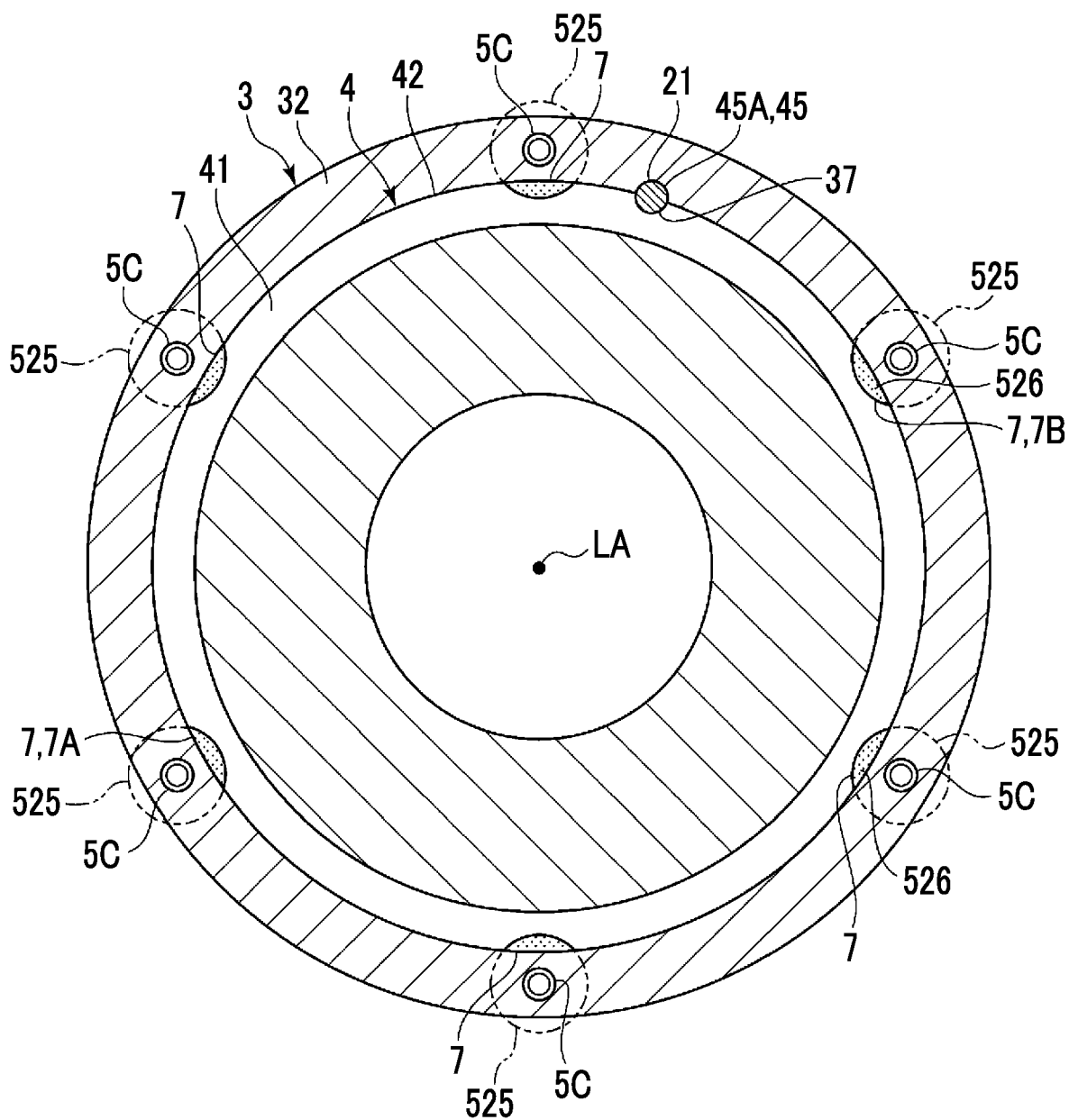
FIG. 5 is a schematic diagram showing a state in which a second surface shown in FIG. 4 is visually recognized from an axial direction of the rotating machine.

FIG. 4 is a schematic cross-sectional view of the vicinity of the fastening part between the first housing and the second housing in the casing for the rotating machine according to an embodiment of the present disclosure. FIG. 5 is a diagram showing a state in which a second surface shown in FIG. 4 is visually recognized from an axial direction of the rotating machine.

In some embodiments, as shown in FIG. 4, the first connection part 32 has a recessed portion 33 into which an outer peripheral edge portion 43 of the second connection part 42 can be fitted, and the at least one fastening device 5 (5C) includes a support plate 51 and a fastening bolt 52. The support plate 51 includes an inner peripheral portion 511 that sandwiches the outer peripheral edge portion 43 of the second connection part 42 between the inner peripheral portion 511 and the recessed portion 33 of the first connection part 32, and an outer peripheral portion 512 that protrudes on an outer side of the second connection part 42 in the radial direction of the rotating machine 1.

In the embodiment shown in FIG. 4, the first connection part 32 has a smooth surface 34 extending along the radial direction of the rotating machine 1 on the outer side of the recessed portion 33 in the radial direction of the rotating machine 1. The recessed portion 33 is formed to be recessed more than the smooth surface 34 in the axial direction of the rotating machine 1. The first surface 31 is formed on a bottom surface of the recessed portion 33. The second connection part 42 is composed of a protrusion portion that protrudes on the outer side in the radial direction along the radial direction of the rotating machine 1. The recessed portion 33 is composed of an annular recessed portion extending along the circumferential direction of the rotating machine 1, and the second connection part 42 is formed in an annular plate shape to be fitted into the annular recessed portion.

In the embodiment shown in FIG. 4, the support plate 51 is formed in an arc shape extending along the circumferential direction of the rotating machine 1. The support plate 51 may be formed in a circular shape extending along the circumferential direction of the rotating machine 1. One surface 513 of the support plate 51 in the axial direction is in contact with a surface 44 of the second connection part 42 opposite to the second surface 41 in the axial direction on the inner peripheral portion 511 and in contact with the smooth surface 34 of the first connection part 32 on the outer peripheral portion 512.

In the embodiment shown in FIG. 4, a female screw hole 35 is formed in the smooth surface 34 of the first connection part 32, and a bolt insertion hole 514 is formed in the outer peripheral portion 512 of the support plate 51. The fastening bolt 52 includes a shaft part 521 that is inserted into the bolt insertion hole 514 and screwed into the first connection part 32, and a head part 522 that holds the outer peripheral portion 512 of the support plate 51 between the head part 522 and the first connection part 32. The shaft part 521 extends along the axial direction and has a male screw portion 523 screwed into the female screw hole 35 on an outer periphery thereof. The support plate 51 holds the outer peripheral edge portion 43 of the second connection part 42 between the support plate 51 and the recessed portion 33 of the first connection part 32 due to the fastening strength generated by the fastening bolt 52, and thus, the first surface 31 and the second surface 41 are brought into close contact with each other, and the frictional resistance against the positional deviation is generated between the first surface 31 and the second surface 41.

With the above configuration, the first connection part 32 and the second connection part 42 can be fastened to each other by the support plate 51 and the fastening bolt 52. With the providing of the rough surface region 7 on the first surface 31 or the second surface 41, it is possible to suppress the positional deviation between the first housing 3 and the second housing 4, and thus, to reduce the fastening strength by the fastening bolt 52 by the suppressed amount. Accordingly, it is possible to reduce a diameter of the fastening bolt 52, and thus, a degree of design freedom of the casing 2 or the rotating machine 1 provided with the casing 2 is improved.

Figure 6:
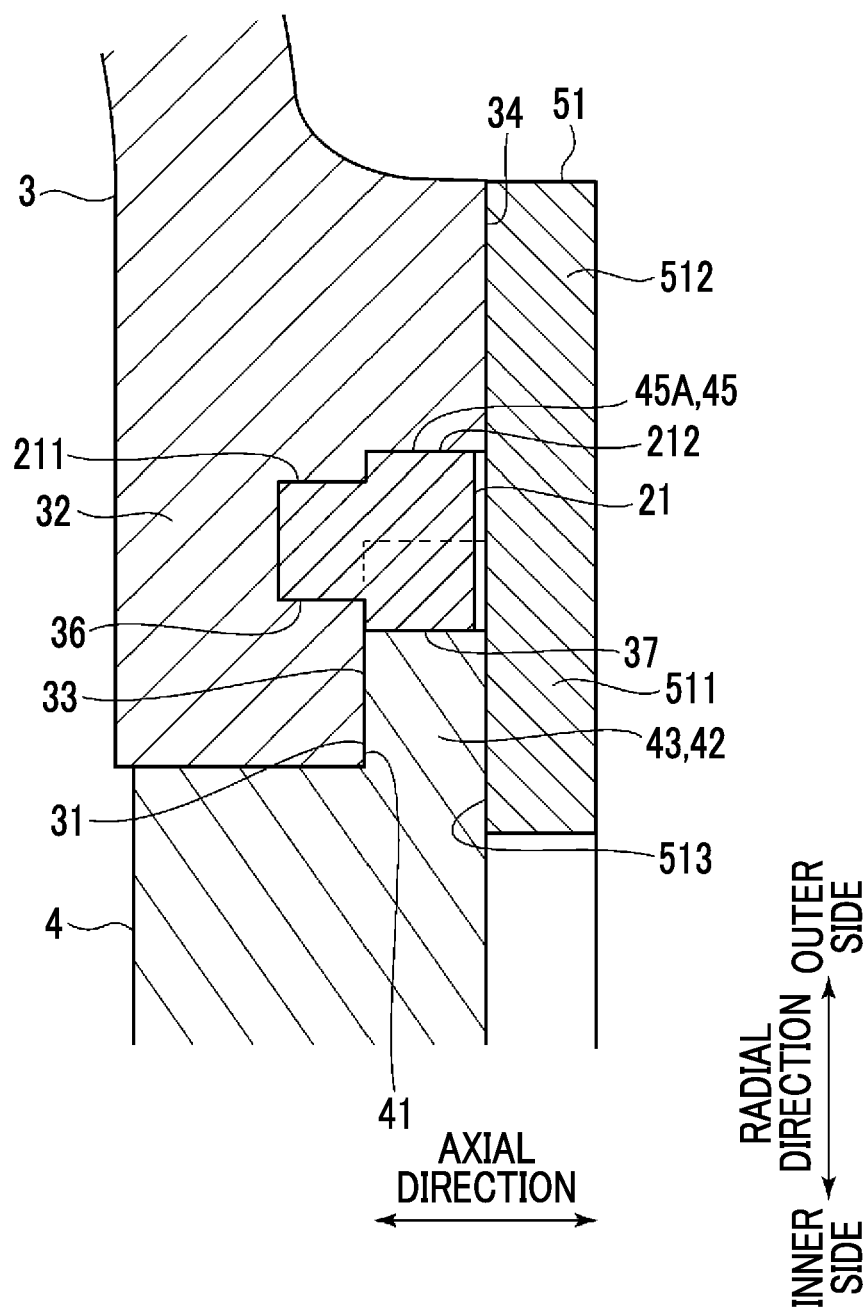
FIG. 6 is a schematic cross-sectional view of the vicinity of a positioning pin in the casing for the rotating machine according to an embodiment of the present disclosure.

FIG. 6 is a schematic cross-sectional view of the vicinity of a positioning pin in the casing for the rotating machine according to an embodiment of the present disclosure. As shown in FIG. 6, the casing 2 may be provided with a positioning pin 21 for suppressing the positional deviation between the first connection part 32 and the second connection part 42.

In the embodiment shown in FIG. 6, the positioning pin 21 includes a small-diameter portion 211 and a large-diameter portion 212 having a diameter larger than that of the small-diameter portion 211. The small-diameter portion 211 is fitted into a small-diameter hole 36 formed in the first connection part 32. A notch 37 cut out in an arc shape is formed on an outer peripheral edge of the outer peripheral edge portion 43 of the second connection part 42. An arc-shaped notch 45A forming a large-diameter hole 45 into which the large-diameter portion 212 is fitted is formed between the first connection part 32 and the notch 37 in the first connection part 32. The large-diameter hole 45 communicates with the small-diameter hole 36 and has a larger diameter than the small-diameter hole 36. A circumferential direction position of the second housing 4 corresponding to a circumferential direction position of the first housing 3 is set in advance. The positioning pin 21 positions the first housing 3 and the second housing 4 at circumferential direction positions set in advance.

With the above configuration, it is possible to suppress the positional deviation between the first housing 3 and the second housing 4 with the providing of the rough surface region 7 on the first surface 31 or the second surface 41, and thus, to suppress wear or damage of the positioning pin 21. Accordingly, it is possible for the positioning pin 21 to exert the action of suppressing the positional deviation between the first connection part 32 and the second connection part 42 over a long period of time.

As shown in FIG. 4, a conical trapezoidal space 525 is defined whose diameter increases, from a head part fastening surface 524 of the fastening bolt 52 toward a fastening strength (axial strength) acting direction (direction toward the first housing 3 along the axial direction, left side in FIG. 5) of the fastening bolt 52, by an inclination angle θ with respect to the fastening strength acting direction. In some embodiments, as shown in FIG. 4, the rough surface region 7 is configured to be present in the conical trapezoidal space 525 that satisfies a condition in which the inclination angle θ is 0° or more and 30° or less. As shown in FIG. 4, the first surface 31 or the second surface 41 includes a fastening strength action surface 526 that is present in the conical trapezoidal space 525. The rough surface region 7 is formed on the fastening strength action surface 526. The rough surface region 7 may not be formed on any surface other than the fastening strength action surface 526 of the first surface 31 or the second surface 41.

With the above configuration, since the fastening strength of the fastening bolt 52 acts on the conical trapezoidal space 525 significantly, a portion (fastening strength action surface 526) that is present in the conical trapezoidal space 525 of the first surface 31 or the second surface 41 has a higher surface pressure than the other portions. With the providing of the rough surface region 7 only in the portion (the fastening strength action surface 526) where the surface pressure is high, it is possible to effectively suppress the positional deviation between the first housing 3 and the second housing 4. Further, with the providing of the rough surface region 7 only in the portion (the fastening strength action surface 526) where the surface pressure is high, it is possible to reduce the rough surface region 7, and thus, to reduce process costs for forming the rough surface region 7. That is, with the above configuration, the process costs can be reduced while suppressing the positional deviation between the first housing 3 and the second housing 4.

In some embodiments, as shown in FIG. 5, the at least one fastening device 5C includes a plurality (six in the illustrated example) of fastening devices 5C disposed at spacings in the circumferential direction of the rotating machine 1. A plurality (six in the illustrated example) of the conical trapezoidal spaces 525 or the fastening strength action surfaces 526 are formed at spacings in the circumferential direction of the rotating machine 1. As shown in FIG. 5, the rough surface region 7 may be formed on each of the plurality of fastening strength action surfaces 526. In other words, the rough surface region 7 includes a plurality of rough surface regions 7 formed on each of the plurality of fastening strength action surfaces 526 disposed at spacings in the circumferential direction of the rotating machine 1. With the forming of the rough surface region 7 on each of the plurality of fastening strength action surfaces 526 in this manner, it is possible to effectively suppress the positional deviation between the first housing 3 and the second housing 4 in the circumferential direction of the rotating machine 1.

In some embodiments, as shown in FIG. 5, the rough surface region 7 includes a first rough surface region 7A formed on one surface (second surface 41 in the illustrated example) of the first surface 31 or the second surface 41 and a second rough surface region 7B provided at a position separated from the first rough surface region 7A on the one surface in the circumferential direction of the rotating machine 1.

With the above configuration, it is possible to effectively suppress the positional deviation between the first housing 3 and the second housing 4 in the circumferential direction with the providing of the first rough surface region 7A and the second rough surface region 7B at positions separated on the one surface in the circumferential direction of the rotating machine 1. Further, with the above configuration, it is possible to reduce the rough surface region 7 as compared with a case where the rough surface region 7 is provided over the entire surface of the one surface. Since working time for forming the rough surface region 7 is affected by an area of the rough surface region 7, it is possible to reduce the process costs for forming the rough surface region 7 with the reduction of the rough surface region 7. That is, with the above configuration, the process costs can be reduced while suppressing the positional deviation between the first housing 3 and the second housing 4.

(Bolt Fastening Structure 2 Between Housings)

The present disclosure is not limited to the case where the support plate 51 and the fastening bolt 52 fasten the first connection part 32 and the second connection part 42, and is applicable to a case where a fastening bolt 53 described below fastens the first connection part 32 and the second connection part 42 and the like.

Figure 7:
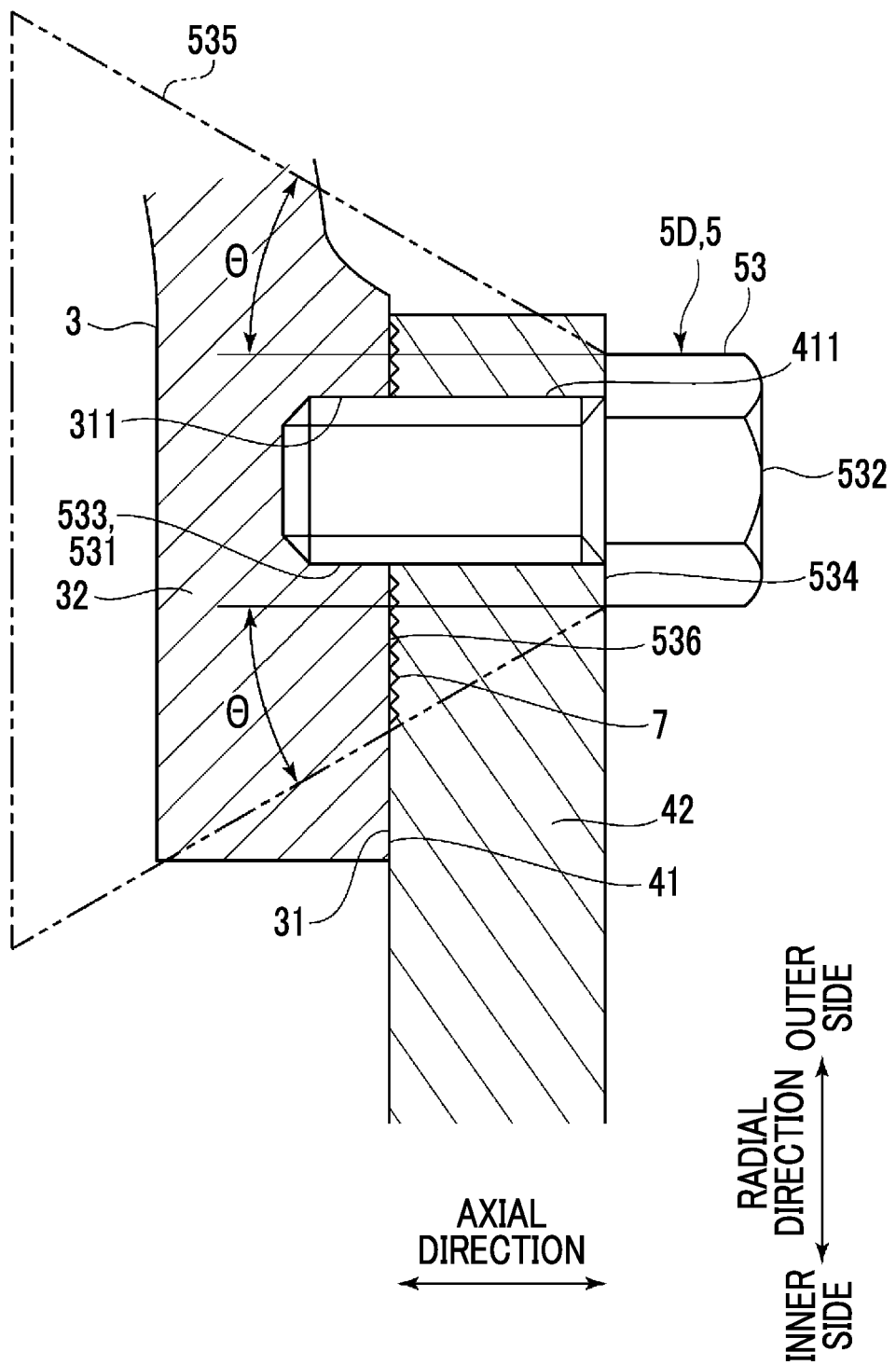
FIG. 7 is a schematic cross-sectional view of the vicinity of the fastening part between the first housing and the second housing in the casing for the rotating machine according to an embodiment of the present disclosure.

FIG. 7 is a schematic cross-sectional view of the vicinity of the fastening part between the first housing and the second housing in the casing for the rotating machine according to an embodiment of the present disclosure.

In some embodiments, as shown in FIG. 7, the fastening device 5 (5D) includes the fastening bolt 53. The fastening bolt 53 includes a shaft part 531 that is inserted into a through-hole 411 formed in the second connection part 42 and screwed into the first connection part 32, and a head part 532 configured to hold the second connection part 42 between the head part 532 and the first connection part 32.

In the embodiment shown in FIG. 7, a female screw hole 311 is formed on the first surface 31, and the through-hole 411 is formed on the second surface 41. The shaft part 531 extends along the axial direction and has a male screw portion 533 screwed into the female screw hole 311 on an outer periphery thereof. With the holding of the second connection part 42 between the head part 532 of the fastening bolt 53 and the first connection part 32 due to the fastening strength generated by the fastening bolt 53, the first surface 31 and the second surface 41 are brought into close contact with each other, and the frictional resistance against the positional deviation is generated between the first surface 31 and the second surface 41.

As shown in FIG. 7, in a case where a conical trapezoidal space 535 is defined whose diameter increases, from a head part fastening surface 534 of the fastening bolt 53 toward a fastening strength (axial strength) acting direction (direction toward the first housing 3 along the axial direction, left side in FIG. 7) of the fastening bolt 53, by an inclination angle θ with respect to the fastening strength acting direction, the rough surface region 7 is configured to be present in the conical trapezoidal space 535 that satisfies a condition in which the inclination angle θ is 0° or more and 30° or less. That is, the rough surface region 7 may be formed on a fastening strength action surface 536 which is a portion that is present in the conical trapezoidal space 535 on the first surface 31 or the second surface 41. The rough surface region 7 may not be formed on any surface other than the fastening strength action surface 536 of the first surface 31 or the second surface 41.

With the above configuration, the fastening bolt 53 can fasten the first connection part 32 and the second connection part 42. With the providing of the rough surface region 7 on the first surface 31 or the second surface 41, it is possible to suppress the positional deviation between the first housing 3 and the second housing 4, and thus, to reduce the fastening strength by the fastening bolt 53 by the suppressed amount. Accordingly, it is possible to reduce a diameter of the fastening bolt 53, and thus, a degree of design freedom of the casing 2 or the rotating machine 1 provided with the casing 2 is improved.

(Coupling Fastening Structure Between Housings)

The present disclosure is not limited to the case where the first connection part 32 and the second connection part 42 are fastened to each other by using the fastening bolt and is also applicable to a case where the first connection part 32 and the second connection part 42 are fastened to each other by using a coupling 54 described below.

Figure 8:
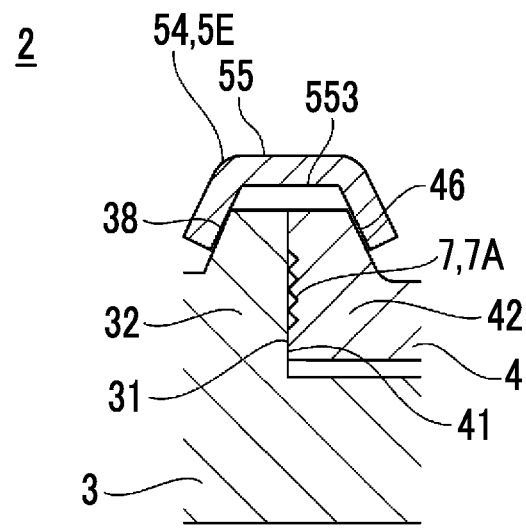
FIG. 8 is a schematic cross-sectional view of the vicinity of the fastening part between the first housing and the second housing in the casing for the rotating machine according to an embodiment of the present disclosure.
Figure 8:
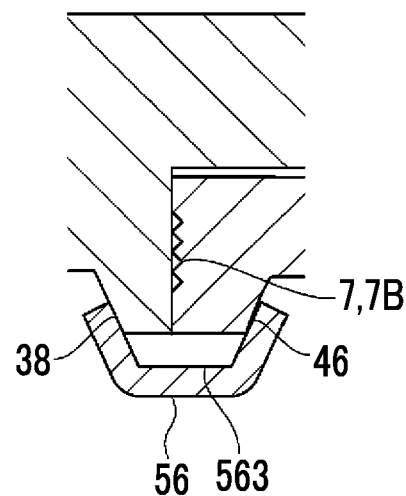
Figure 9:
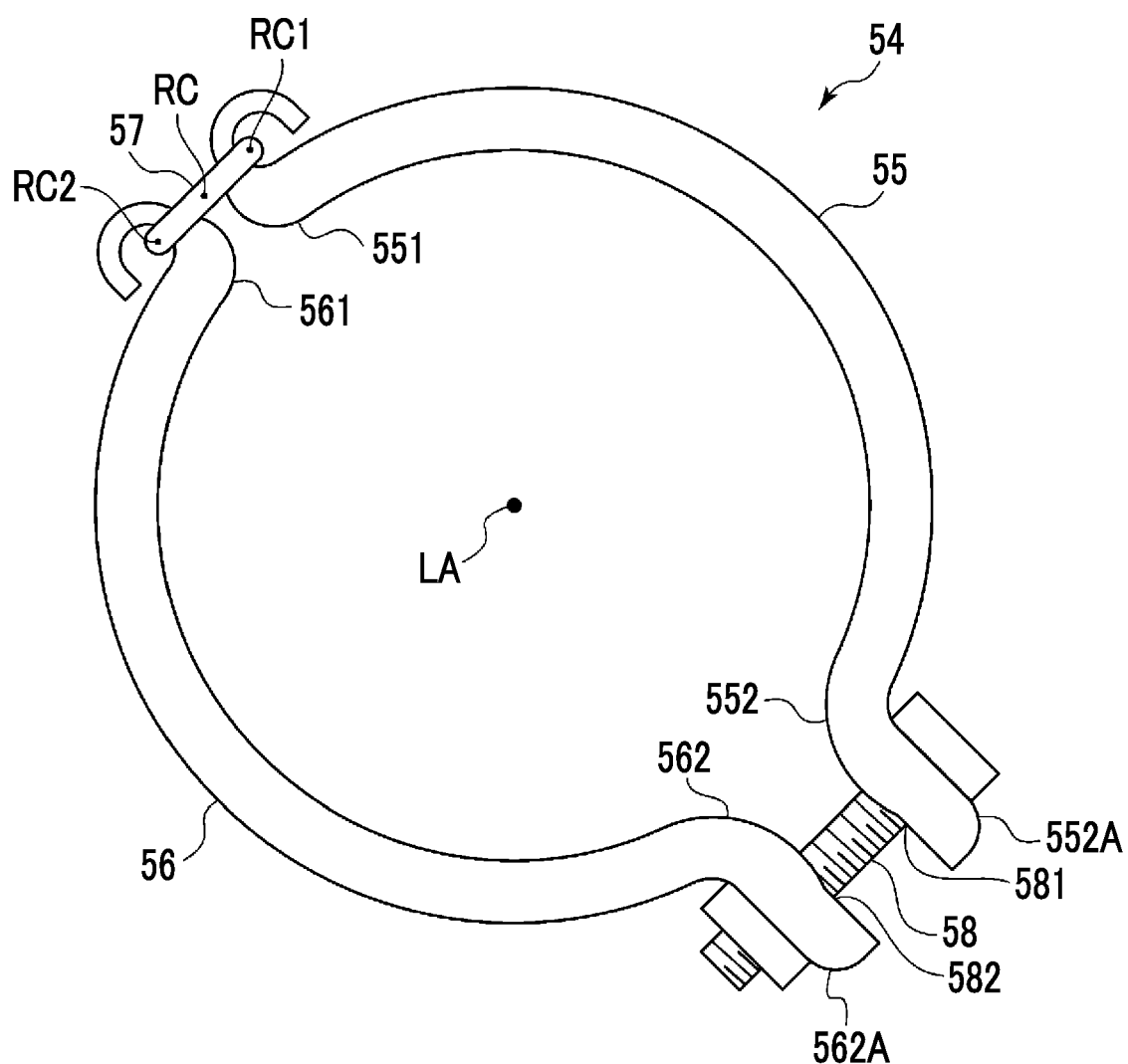
FIG. 9 is an explanatory diagram for describing a fastening device shown in FIG. 8.
Figure 10:
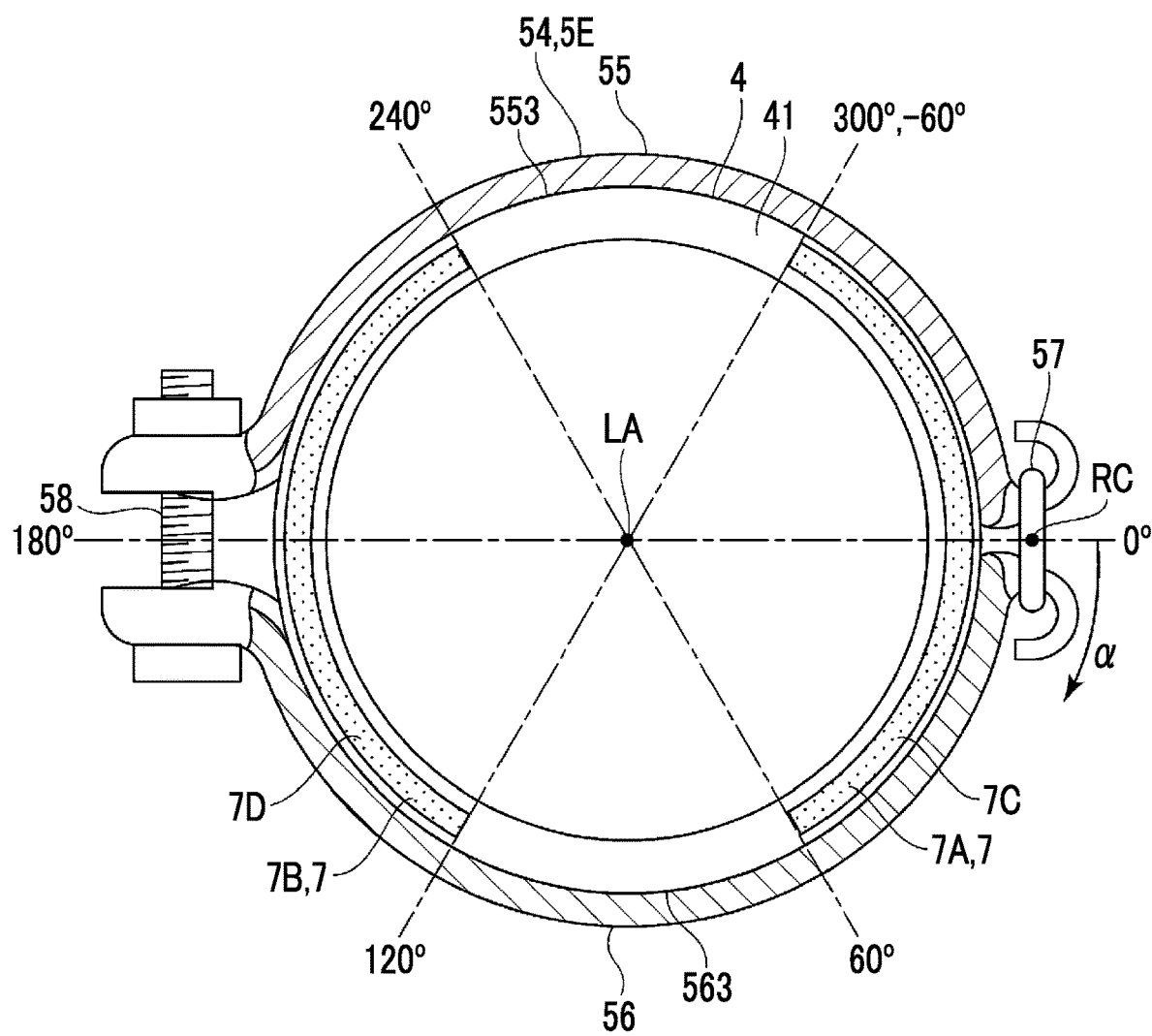
FIG. 10 is a schematic diagram showing a state in which the second surface shown in FIG. 8 is visually recognized from the axial direction of the rotating machine.

FIG. 8 is a schematic cross-sectional view of the vicinity of the fastening part between the first housing and the second housing in the casing for the rotating machine according to an embodiment of the present disclosure. FIG. 9 is an explanatory diagram for describing the fastening device shown in FIG. 8. FIG. 10 is a diagram showing a state in which the second surface shown in FIG. 8 is visually recognized from the axial direction of the rotating machine.

In some embodiments, as shown in FIG. 9, the fastening device 5 (5E) includes the coupling 54 (V-band coupling). The coupling 54 includes a first arcuate member 55 extending along the circumferential direction of the rotating machine 1, a second arcuate member 56 extending along the circumferential direction of the rotating machine 1, a rotation part 57 configured to rotatably link one end portion 551 of the first arcuate member 55 with one end portion 561 of the second arcuate member 56, and a fastening part 58 that fastens the other end portion 552 of the first arcuate member 55 and the other end portion 562 of the second arcuate member 56.

As shown in FIG. 8, the first connection part 32 includes a first flange part 38 that protrudes on the outer side in the radial direction of the rotating machine 1. A surface of the first flange part 38 opposite to the first surface 31 in the axial direction may be inclined such that a distance from the first surface 31 decreases toward the outer side in the radial direction. The second connection part 42 includes a second flange part 46 that protrudes on the outer side in the radial direction of the rotating machine 1. A surface of the second flange part 46 opposite to the second surface 41 in the axial direction may be inclined such that a distance from the second surface 41 decreases toward the outer side in the radial direction.

The first arcuate member 55 has a first fitting groove 553 that is fitted to the first flange part 38 of the first connection part 32 and to the second flange part 46 of the second connection part 42 from the outer side in the radial direction of the rotating machine 1. The first fitting groove 553 is formed on an inner peripheral side of the first arcuate member 55. The second arcuate member 56 has a second fitting groove 563 that is fitted to the first flange part 38 of the first connection part 32 and to the second flange part 46 of the second connection part 42 from the outer side in the radial direction of the rotating machine 1. The second fitting groove 563 is formed on an inner peripheral side of the second arcuate member 56. In the second arcuate member 56, the second fitting groove 563 faces the first fitting groove 553. In the illustrated embodiment, each of the first arcuate member 55 and the second arcuate member 56 is formed in a semi-arc shape.

In the embodiment shown in FIG. 9, the rotation part 57 is configured to rotate the first arcuate member 55 around a first rotation center RC1. Further, the rotation part 57 is configured to rotate the second arcuate member 56 around a second rotation center RC2. As shown in FIG. 9, as viewed from one side in the axial direction, center positions of the first rotation center RC1 and the second rotation center RC2 are set as a rotation center RC of the rotation part 57.

In the embodiment shown in FIG. 9, the first arcuate member 55 includes a first protrusion portion 552A that protrudes on the outer side of the other end portion 552 in the radial direction of the rotating machine 1. The second arcuate member 56 includes a second protrusion portion 562A that protrudes on the outer side of the other end portion 562 in the radial direction of the rotating machine 1. The fastening part 58 has a first fastening part 581 that is fastened to the first protrusion portion 552A and a second fastening part 582 that is fastened to the second protrusion portion 562A. With the fastening of the other end portion 552 of the first arcuate member 55 to the other end portion 562 of the second arcuate member 56 by the fastening part 58 (first fastening part 581, second fastening part 582), a spacing between the first fastening part 581 and the second fastening part 582 is shorter than that before the fastening, and thus, the first connection part 32 or the second connection part 42 is held into the first fitting groove 553 or the second fitting groove 563. Accordingly, a pressing force toward a mating side in the axial direction acts on the first connection part 32 or the second connection part 42, the first surface 31 and the second surface 41 are brought into close contact with each other, and the frictional resistance against the positional deviation is generated between the first surface 31 and the second surface 41.

With the above configuration, the first connection part 32 and the second connection part 42 are held by the first arcuate member 55 and the second arcuate member 56 with the fastening of the other end portion 552 of the first arcuate member 55 and the other end portion 562 of the second arcuate member 56 by the fastening part 58. Accordingly, the first connection part 32 and the second connection part 42 can be fastened to each other. With the providing of the rough surface region 7 on the first surface 31 or the second surface 41, it is possible to suppress the positional deviation between the first housing 3 and the second housing 4, and thus, to reduce the fastening strength by the fastening device 5 by the suppressed amount. Accordingly, it is possible to reduce a diameter of the fastening device 5E, and thus, a degree of design freedom of the casing 2 or the rotating machine 1 provided with the casing 2 is improved.

As shown in FIG. 10, regarding an angle position around the axis line LA of the rotating machine 1, the rotation center RC of the rotation part 57 is set to 0°, and an angle position α is defined such that the angle gradually increases toward the fastening part 58 via the second arcuate member 56 from the rotation part 57.

In some embodiments, as shown in FIG. 10, the rough surface region 7 includes a rotation-part-side rough surface region 7C formed within an angle range satisfying a condition of $-60° \leq \alpha \leq 60°$. With the above configuration, the surface pressure of the rotation-part-side rough surface region 7C is high since the fastening strength of the fastening device 5E (coupling 54) acts on the rotation-part-side rough surface region 7C significantly. With the providing of the rough surface region 7 only in the portion where the surface pressure is high, it is possible to effectively suppress the positional deviation between the first housing 3 and the second housing 4. Further, with the providing of the rough surface region 7 only in the portion where the surface pressure is high, it is possible to reduce the process costs for forming the rough surface region 7 with the reduction of the rough surface region 7. That is, with the above configuration, the process costs can be reduced while suppressing the positional deviation between the first housing 3 and the second housing 4. The rough surface region 7 may not be formed in any portion other than the rotation-part-side rough surface region 7C.

In some embodiments, as shown in FIG. 10, the rough surface region 7 includes a fastening-part-side rough surface region 7D formed within an angle range satisfying a condition of $120° \leq \alpha \leq 240°$. With the above configuration, the surface pressure of the fastening-part-side rough surface region 7D is high since the fastening strength of the fastening device 5E (coupling 54) acts on the fastening-part-side rough surface region 7D significantly. With the providing of the rough surface region 7 only in the portion where the surface pressure is high, it is possible to effectively suppress the positional deviation between the first housing 3 and the second housing 4. Further, with the providing of the rough surface region 7 only in the portion where the surface pressure is high, it is possible to reduce the process costs for forming the rough surface region 7 with the reduction of the rough surface region 7. That is, with the above configuration, the process costs can be reduced while suppressing the positional deviation between the first housing 3 and the second housing 4. The rough surface region 7 may not be formed in any portion other than the fastening-part-side rough surface region 7D.

In some embodiments, as shown in FIG. 10, the rough surface region 7 includes the rotation-part-side rough surface region 7C and the fastening-part-side rough surface region 7D. With the above configuration, the process costs can be reduced while suppressing the positional deviation between the first housing 3 and the second housing 4 with the providing of the rough surface region 7 only in the portion (the rotation-part-side rough surface region 7C and the fastening-part-side rough surface region 7D) where the surface pressure is high. Further, since the rotation-part-side rough surface region 7C and the fastening-part-side rough surface region 7D are formed at positions separated from each other in the circumferential direction of the rotating machine 1, it is possible to effectively suppress the positional deviation in the circumferential direction between the first housing 3 and the second housing 4. The rough surface region 7 may not be formed in any portion other than the rotation-part-side rough surface region 7C and the fastening-part-side rough surface region 7D.

In some embodiments, the second housing 4 is formed of a material harder than that of the first housing 3, and the rough surface region 7 is formed on the second surface 41 of the second housing 4. The hardness of the first housing 3 or the second housing 4 may be evaluated based on a test result of a hardness test (for example, measured value of Vickers hardness).

In the embodiment shown in FIG. 1, the center housing 66 is formed of a material harder than that of the compressor housing 64. In certain embodiments, a shape of the compressor housing 64 is formed of an aluminum material, and a shape of the center housing 66 is formed of a cast iron material. In this case, it is preferable to form the rough surface region 7 on the first-center-side surface 661 rather than on the compressor-side surface 641.

With the above configuration, in a case where the first surface 31 is in contact with the second surface 41, the convex portion 74 formed in the rough surface region 7 bites into the first surface 31 with the forming of the rough surface region 7 on the second surface 41 of the second housing 4 formed of the material harder than that of the first housing 3, and thus, it is possible to enhance the adhesiveness between the first surface 31 and the second surface 41. Accordingly, it is possible to effectively suppress the positional deviation between the first housing 3 and the second housing 4.

As shown in FIG. 1, the rotating machine 1 according to some embodiments is provided with at least the casing 2 and the impeller 12. With the above configuration, it is possible to suppress the positional deviation between the housings 3 and 4 in the casing 2 configured by the plurality of housings (the first housing 3, the second housing 4, and the like), and thus, to suppress the malfunction of the actuator in which at least a part thereof is accommodated in the casing 2. Since the malfunction of the actuator is suppressed, it is possible to improve the reliability of the rotating machine 1.

FIG. 11 is a flow chart for describing a method for producing the casing for the rotating machine according to an embodiment of the present disclosure.

As shown in FIG. 11, a method 100 for producing the casing 2 of the rotating machine 1 according to some embodiments is provided with a rough surface region forming step S101 of irradiating at least one of the first surface 31 or the second surface 41 with the laser light to form the rough surface region 7 including the plurality of laser irradiation marks 71.

As shown in FIG. 11, the method 100 for producing the casing 2 may be further provided with a cartridge assembly step S102 of assembling a cartridge including the center housing 66, a compressor housing mounting step S103 of mounting the compressor housing 64 to the center housing 66 of the cartridge, and a turbine housing mounting step S104 of mounting the turbine housing 65 to the center housing 66 of the cartridge.

In the cartridge assembly step S102, the bearing 63, the rotating shaft 11, the compressor impeller 61, and the turbine blade 62 are mounted to the center housing 66 to form the cartridge. In the compressor housing mounting step S103, the compressor-side connection part 642 and the first-center-side connection part 662 are fastened to each other in the axial direction via the fastening device 5A (5). In the turbine housing mounting step S104, the turbine-side connection part 652 and the second-center-side connection part 664 are fastened to each other via the fastening device 5B (5).

The method 100 for producing the casing 2 is not limited to the order shown in FIG. 11. The rough surface region forming step S101 may be performed before the cartridge assembly step S102 or after the cartridge assembly step S102. The compressor housing mounting step S103 may be performed before the turbine housing mounting step S104 or after the turbine housing mounting step S104.

With the above method, since the rough surface region 7 formed in the rough surface region forming step S101 has the undulation formed by the irradiation with the laser light, the rough surface region 7 has a rough surface and a large friction coefficient as compared with the region 72 not irradiated with the laser light. With the providing of the rough surface region 7 having the large friction coefficient on the first surface 31 or the second surface 41, it is possible to increase the frictional resistance between the first surface 31 and the second surface 41. Further, with the providing of the rough surface region 7 on the first surface 31 or the second surface 41, it is possible to enhance adhesiveness between the first surface 31 and the second surface 41. Accordingly, it is possible to suppress the positional deviation between the first housing 3 and the second housing 4.

In some embodiments, in the rough surface region forming step S101, the rough surface region 7 is formed by the laser light emitted from the laser marker device 8 having the laser light output of 100 W or less.

With the above method, the rough surface region 7 having appropriate surface roughness is formed by irradiating the first surface 31 or the second surface 41 with the laser light having the output of 100 W or less. With the providing of the rough surface region 7 on the first surface 31 or the second surface 41, it is possible to effectively improve the frictional resistance and the adhesiveness between the first surface 31 and the second surface 41. Accordingly, it is possible to effectively suppress the positional deviation between the first housing 3 and the second housing 4. Further, since the laser marker device 8 having the laser light output of 100 W or less is cheaper than a laser light irradiation device having a laser light output of more than 100 W, it is possible to suppress an increase in equipment costs.

The present disclosure is not limited to the embodiments described above and includes a form in which a modification is added to the embodiments described above or a form in which the above forms are combined as appropriate.

The contents described in some embodiments described above are understood as follows, for example.

1) A casing (2) for a rotating machine (1) according to at least one embodiment of the present disclosure is
 a casing (2) for a rotating machine (1) configured such that a plurality of housings are linked to each other, the casing (2) for a rotating machine (1) including
 a first housing (3) that includes a first connection part (32) having a first surface (31) extending along a radial direction of the rotating machine (1),
 a second housing (4) that includes a second connection part (42) having a second surface (41) extending along the radial direction and being in contact with the first surface (31), and
 at least one fastening device (5) that fastens the first connection part (32) and the second connection part (42) in an axial direction of the rotating machine (1),
 in which at least one of the first surface (31) or the second surface (41) includes, in at least a part of the first surface or the second surface, a rough surface region (7) in which a plurality of laser irradiation marks (71) formed by irradiation with laser light are formed.

With the configuration of 1) above, since the rough surface region (7) has the undulation formed by the irradiation with the laser light, the rough surface region (7) has a rough surface and a large friction coefficient as compared with the region (72) not irradiated with the laser light. With the providing of the rough surface region (7) having the large friction coefficient on the first surface (31) or the second surface (41), it is possible to increase the frictional resistance between the first surface (31) and the second surface (41). Further, with the providing of the rough surface region (7) on the first surface (31) or the second surface (41), it is possible to enhance adhesiveness between the first surface (31) and the second surface (41). Accordingly, it is possible to suppress the positional deviation between the first housing (3) and the second housing (4).

2) In some embodiments, in the casing (2) of a rotating machine (1) according to 1) above,
 the rough surface region (7) includes
 a first rough surface region (7A) formed on one surface of the first surface (31) or the second surface (41), and
 a second rough surface region (7B) provided at a position separated from the first rough surface region (7A) on the one surface in a circumferential direction of the rotating machine (1).

With the configuration of 2) above, it is possible to effectively suppress the positional deviation between the first housing (3) and the second housing (4) in the circumferential direction with the providing of the first rough surface region (7A) and the second rough surface region (7B) at positions separated on the one surface in the circumferential direction of the rotating machine (1). Further, with the configuration of 2) above, it is possible to reduce the rough surface region (7) as compared with a case where the rough surface region (7) is provided over the entire surface of the one surface. Since working time for forming the rough surface region (7) is affected by an area of the rough surface region (7), it is possible to reduce the process costs for forming the rough surface region (7) with the reduction of the rough surface region (7). That is, with the configuration of 2) above, the process costs can be reduced while suppressing the positional deviation between the first housing (3) and the second housing (4).

3) In some embodiments, in the casing (2) of a rotating machine (1) according to 1) or 2) above,
 the first connection part (32) has a recessed portion (33) into which an outer peripheral edge portion (43) of the second connection part (42) is fittable, and
 the at least one fastening device (5 (5C)) includes
 a support plate (51) that includes an inner peripheral portion (511) that sandwiches the outer peripheral edge portion (43) of the second connection part (42) between the inner peripheral portion and the recessed portion (33) of the first connection part (32) and an outer peripheral portion (512) that protrudes on an outer side of the second connection part (42) in the radial direction of the rotating machine (1), and
 a fastening bolt (52) that fastens the outer peripheral portion (512) of the support plate (51) to the first connection part (32).

With the configuration of 3) above, the first connection part (32) and the second connection part (42) can be fastened to each other by the support plate (51) and the fastening bolt (52). With the providing of the rough surface region (7) on the first surface (31) or the second surface (41), it is possible to suppress the positional deviation between the first housing (3) and the second housing (4), and thus, to reduce the fastening strength by the fastening bolt (52) by the suppressed amount. Accordingly, it is possible to reduce a diameter of the fastening bolt (52), and thus, a degree of design freedom of the casing (2) or the rotating machine (1) provided with the casing (2) is improved.

4) In some embodiments, in the casing (2) of a rotating machine (1) according to 3) above,
 in a case where a conical trapezoidal space (525) is defined whose diameter increases, from a head part fastening surface (524) of the fastening bolt (52) toward a fastening strength acting direction of the fastening bolt (52), by an inclination angle $\theta$ with respect to the fastening strength acting direction, the rough surface region (7) is configured to be present in the conical trapezoidal space (525) that satisfies a condition in which the inclination angle $\theta$ is 0° or more and 30° or less.

With the configuration of 4) above, since the fastening strength of the fastening bolt (52) acts on the conical trapezoidal space (525) significantly, a portion (fastening strength action surface 526) that is present in the conical trapezoidal space (525) of the first surface (31) or the second surface (41) has a higher surface pressure than the other portions. With the providing of the rough surface region (7) only in the portion where the surface pressure is high, it is possible to effectively suppress the positional deviation between the first housing (3) and the second housing (4). Further, with the providing of the rough surface region (7) only in the portion where the surface pressure is high, it is possible to reduce the process costs for forming the rough surface region (7) with the reduction of the rough surface region (7). That is, with the configuration of 4) above, the process costs can be reduced while suppressing the positional deviation between the first housing (3) and the second housing (4).

5) In some embodiments, in the casing of a rotating machine according to 1) or 2) above, the at least one fastening device (5 (5E)) includes a first arcuate member (55) that has a first fitting groove (553) that is fitted to the first connection part (32) and the second connection part (42) from an outer side in the radial direction and extends along a circumferential direction of the rotating machine (1), a second arcuate member (56) that has a second fitting groove (563) that is fitted to the first connection part (32) and the second connection part (42) from the outer side in the radial direction and extends along the circumferential direction of the rotating machine (1), a rotation part (57) configured to rotatably link one end portion (551) of the first arcuate member (55) and one end portion (561) of the second arcuate member (56), and a fastening part (58) that fastens the other end portion (552) of the first arcuate member (55) and the other end portion (562) of the second arcuate member (56).

With the configuration of 5) above, the first connection part (32) and the second connection part (42) are held by the first arcuate member (55) and the second arcuate member (56) with the fastening of the other end portion (552) of the first arcuate member (55) and the other end portion (562) of the second arcuate member (56) by the fastening part (58). Accordingly, the first connection part (32) and the second connection part (42) can be fastened to each other. With the providing of the rough surface region (7) on the first surface (31) or the second surface (41), it is possible to suppress the positional deviation between the first housing (3) and the second housing (4), and thus, to reduce the fastening strength by the fastening device (5) by the suppressed amount. Accordingly, it is possible to reduce a diameter of the fastening device (5E), and thus, a degree of design freedom of the casing (2) or the rotating machine (1) provided with the casing (2) is improved.

6) In some embodiments, in the casing (2) of a rotating machine (1) according to 5) above, in a case where, regarding an angle position around an axis line (LA) of the rotating machine (1), a rotation center of the rotation part (57) is set to 0° and an angle position α is defined such that an angle gradually increases toward the fastening part via the second arcuate member (56) from the rotation part (57), the rough surface region (7) includes a rotation-part-side rough surface region (7C) formed within an angle range satisfying a condition of $-60° \leq \alpha \leq 60°$.

With the configuration of 6) above, the surface pressure of the rotation-part-side rough surface region (7C) is high since the fastening strength of the fastening device (5E, coupling 54) acts on the rough surface region (7C) significantly. With the providing of the rough surface region (7) only in the portion where the surface pressure is high, it is possible to effectively suppress the positional deviation between the first housing (3) and the second housing (4). Further, with the providing of the rough surface region (7) only in the portion where the surface pressure is high, it is possible to reduce the process costs for forming the rough surface region (7) with the reduction of the rough surface region (7). That is, with the configuration of 6) above, the process costs can be reduced while suppressing the positional deviation between the first housing (3) and the second housing (4).

7) In some embodiments, in the casing (2) of a rotating machine (1) according to 5) or 6) above, in a case where, regarding an angle position around an axis line (LA) of the rotating machine (1), a rotation center of the rotation part (57) is set to 0° and an angle position α is defined such that an angle gradually increases toward the fastening part (58) via the second arcuate member (56) from the rotation part (57), the rough surface region (7) includes a fastening-part-side rough surface region (7D) formed within an angle range satisfying a condition of $120° \leq \alpha \leq 240°$.

With the configuration of 7) above, the surface pressure of the fastening-part-side rough surface region (7D) is high since the fastening strength of the fastening device (5E, coupling 54) acts on the fastening-part-side rough surface region (7D) significantly. With the providing of the rough surface region (7) only in the portion where the surface pressure is high, it is possible to effectively suppress the positional deviation between the first housing (3) and the second housing (4). Further, with the providing of the rough surface region (7) only in the portion where the surface pressure is high, it is possible to reduce the process costs for forming the rough surface region (7) with the reduction of the rough surface region (7). That is, with the configuration of 6) above, the process costs can be reduced while suppressing the positional deviation between the first housing (3) and the second housing (4).

8) In some embodiments, in the casing (2) of a rotating machine (1) according to 1) or 2) above, the at least one fastening device (5 (5D)) includes a fastening bolt (53) including a shaft part (531) that is inserted into a through-hole (411) formed in the second connection part (42) and screwed into the first connection part (32), and a head part (532) configured to hold the second connection part (42) between the head part (532) and the first connection part (32).

With the configuration of 8) above, the fastening bolt (53) can fasten the first connection part (32) and the second connection part (42). With the providing of the rough surface region (7) on the first surface (31) or the second surface (41), it is possible to suppress the positional deviation between the first housing (3) and the second housing (4), and thus, to reduce the fastening strength by the fastening bolt (53) by the suppressed amount. Accordingly, it is possible to reduce a diameter of the fastening bolt (53), and thus, a degree of design freedom of the casing (2) or the rotating machine (1) provided with the casing (2) is improved.

9) In some embodiments, in the casing (2) of a rotating machine (1) according to any one of 1) to 8) above, the second housing (4) is formed of a material harder than a material of the first housing (3), and the rough surface region (7) is formed on the second surface (41) of the second housing (4).

With the configuration of 9) above, in a case where the first surface (31) is in contact with the second surface (41), the convex portion (74) formed in the rough surface region (7) bites into the first surface (31) with the forming of the rough surface region (7) on the second surface (41) of the second housing (4) formed of the material harder than a material of the first housing (3), and thus, it is possible to enhance the adhesiveness between the first surface (31) and the second surface (41). Accordingly, it is possible to effectively suppress the positional deviation between the first housing (3) and the second housing (4).

10) In some embodiments, in the casing (2) of a rotating machine (1) according to any one of 1) to 9) above, the plurality of laser irradiation marks (71) are formed by the laser light emitted from a laser marker device (8) having a laser light output of 100 W or less.

With the configuration of 10) above, the rough surface region (7) having appropriate surface roughness is formed by irradiating the first surface (31) or the second surface (41) with the laser light having the output of 100 W or less. With the providing of the rough surface region (7) on the first surface (31) or the second surface (41), it is possible to effectively improve the frictional resistance and the adhesiveness between the first surface (31) and the second surface (41). Accordingly, it is possible to effectively suppress the positional deviation between the first housing (3) and the second housing (4). Further, since the laser marker device (8) having the laser light output of 100 W or less is cheaper than a laser light irradiation device having a laser light output of more than 100 W, it is possible to suppress an increase in equipment costs.

11) A rotating machine (1) according to at least one embodiment of the present disclosure includes the casing (2) of a rotating machine (1) according to any one of 1) to 10) above, and an impeller (12) that is rotatably accommodated in the casing (2).

With the configuration of 11) above, it is possible to suppress the positional deviation between the housings (3, 4) in the casing (2) configured by the plurality of housings (the first housing 3, the second housing 4, and the like), and thus, to suppress the malfunction of the actuator in which at least a part thereof is accommodated in the casing (2). Since the malfunction of the actuator is suppressed, it is possible to improve the reliability of the rotating machine (1).

12) A method (100) for producing a casing (2) of a rotating machine (1) according to at least one embodiment of the present disclosure is a method (100) for producing a casing (2) of a rotating machine (1) configured such that a plurality of housings (3, 4) are linked to each other, the plurality of housings (3, 4) including a first housing (3) including a first connection part (32) having a first surface (31) extending along a radial direction of the rotating machine (1), and a second housing (4) including a second connection part (42) having a second surface (41) extending along the radial direction and being in contact with the first surface (31), the method (100) for producing a casing (2) for a rotating machine (1) including a rough surface region forming step (S101) of irradiating at least one of the first surface (31) or the second surface (41) with laser light to form a rough surface region (7) including a plurality of laser irradiation marks (71).

According to the method of 12) above, since the rough surface region (7) formed in the rough surface region forming step (S101) has the undulation formed by the irradiation with the laser light, the rough surface region (7) has a rough surface and a large friction coefficient as compared with the region (72) not irradiated with the laser light. With the providing of the rough surface region (7) having the large friction coefficient on the first surface (31) or the second surface (41), it is possible to increase the frictional resistance between the first surface (31) and the second surface (42). Further, with the providing of the rough surface region (7) on the first surface (31) or the second surface (41), it is possible to enhance adhesiveness between the first surface (31) and the second surface (41). Accordingly, it is possible to suppress the positional deviation between the first housing (3) and the second housing (4).

13) In some embodiments, in the method (100) for producing a casing (2) of a rotating machine (1) according to 12) above, in the rough surface region forming step (S101), the rough surface region (7) is formed by the laser light emitted from a laser marker device (8) having a laser light output of 100 W or less.

With the method of 13) above, the rough surface region (7) having appropriate surface roughness is formed by irradiating the first surface (31) or the second surface (41) with the laser light having the output of 100 W or less. With the providing of the rough surface region (7) on the first surface (31) or the second surface (41), it is possible to effectively improve the frictional resistance and the adhesiveness between the first surface (31) and the second surface (41). Accordingly, it is possible to effectively suppress the positional deviation between the first housing (3) and the second housing (4). Further, since the laser marker device (8) having the laser light output of 100 W or less is cheaper than a laser light irradiation device having a laser light output of more than 100 W, it is possible to suppress an increase in equipment costs.

REFERENCE SIGNS LIST

1: rotating machine
2: casing
3: first housing
4: second housing
5, 5A to 5E: fastening device
6: turbocharger
7: rough surface region
7A: first rough surface region
7B: second rough surface region
7C: rotation-part-side rough surface region
7D: fastening-part-side rough surface region
8: laser marker device
11: rotating shaft
12: impeller
21: positioning pin
31: first surface
32: first connection part
33: recessed portion
41: second surface
42: second connection part
51: support plate
52, 53: fastening bolt
54: coupling
55: first arcuate member
56: second arcuate member
57: rotation part
58: fastening part
61: compressor impeller
62: turbine blade
63: bearing
64: compressor housing
65: turbine housing
66: center housing
71: laser irradiation mark
72: region
73: recessed portion
74: convex portion
81: laser light irradiation unit
82: irradiation position adjustment unit
100: method for producing casing LA: axis line
RC: rotation center

The invention claimed is:

1. A casing for a rotating machine configured such that a plurality of housings are linked to each other, the casing for the rotating machine comprising:
a first housing that includes a first connection part having a first surface extending along a radial direction of the rotating machine;
a second housing that includes a second connection part having a second surface extending along the radial direction and being in contact with the first surface, and
at least one fastening device that fastens the first connection part and the second connection part in an axial direction of the rotating machine,
wherein at least one of the first surface or the second surface includes a rough surface region in which a plurality of laser irradiation marks formed by irradiation with laser light are formed and a non-rough surface region in which the laser irradiation marks are not formed,
wherein the first connection part has a recessed portion into which an outer peripheral edge portion of the second connection part is fittable,
the at least one fastening device includes
a support plate that includes an inner peripheral portion that sandwiches the outer peripheral edge portion of the second connection part between the inner peripheral portion and the recessed portion of the first connection part and an outer peripheral portion that protrudes on an outer side of the second connection part in the radial direction of the rotating machine, and
a fastening bolt that fastens the outer peripheral portion of the support plate to the first connection part,
wherein in a case where a conical trapezoidal space is defined whose diameter increases, from a head part fastening surface of the fastening bolt toward a fastening strength acting direction of the fastening bolt, by an inclination angle $\theta$ with respect to the fastening strength acting direction, the rough surface region is configured to be present in the conical trapezoidal space that satisfies a condition in which the inclination angle $\theta$ is 0° or more and 30° or less, and the non-rough surface region is configured not to be present in the conical trapezoidal space and
wherein the casing is configured such that when the first surface and the second surface are brought into close contact by a fastening force generated by the fastening device, a frictional resistance against positional deviation is generated in the rough surface region, and a continuous contact surface is formed between the first surface and the second surface in the non-rough surface region.

2. The casing for a rotating machine according to claim 1, wherein the rough surface region includes
a first rough surface region formed on one surface of the first surface or the second surface, and
a second rough surface region provided at a position separated from the first rough surface region on the one surface in a circumferential direction of the rotating machine.

3. The casing for a rotating machine according to claim 1, wherein the at least one fastening device includes
a fastening bolt including
a shaft part that is inserted into a through-hole formed in the second connection part and screwed into the first connection part, and
a head part configured to hold the second connection part between the head part and the first connection part.

4. The casing for a rotating machine according to claim 1, wherein the second housing is formed of a material harder than a material of the first housing, and
the rough surface region is formed on the second surface of the second housing.

5. The casing for a rotating machine according to claim 1, wherein the plurality of laser irradiation marks are formed by the laser light emitted from a laser marker device having a laser light output of 100 W or less.

6. A rotating machine comprising:
the casing according to claim 1; and
an impeller that is rotatably accommodated in the casing.

7. A method for producing a casing for a rotating machine configured such that a plurality of housings are linked to each other, the plurality of housings including
a first housing that includes a first connection part having a first surface extending along a radial direction of the rotating machine, and
a second housing that includes a second connection part having a second surface extending along the radial direction and being in contact with the first surface,
the method for producing the casing for a rotating machine comprising,
a rough surface region forming step of irradiating at least one of the first surface or the second surface with laser light to form a rough surface region including a plurality of laser irradiation marks, and a non-rough surface region forming step of forming the non-rough surface region in which the laser irradiation marks are not formed,
wherein the first connection part has a recessed portion into which an outer peripheral edge portion of the second connection part is fittable,
the at least one fastening device includes
a support plate that includes an inner peripheral portion that sandwiches the outer peripheral edge portion of the second connection part between the inner peripheral portion and the recessed portion of the first connection part and an outer peripheral portion that protrudes on an outer side of the second connection part in the radial direction of the rotating machine, and
a fastening bolt that fastens the outer peripheral portion of the support plate to the first connection part,
wherein in a case where a conical trapezoidal space is defined whose diameter increases, from a head part fastening surface of the fastening bolt toward a fastening strength acting direction of the fastening bolt, by an inclination angle $\theta$ with respect to the fastening strength acting direction, the rough surface region is configured to be present in the conical trapezoidal space that satisfies a condition in which the inclination angle $\theta$ is 0° or more and 30° or less, and the non-rough surface regions is configured not to be present in the conical trapezoidal space, and
wherein the casing is configured such that when the first surface and the second surface are brought into close contact by a fastening force generated by the fastening device, a frictional resistance against positional deviation is generated in the rough surface region, and a continuous contact surface is formed between the first surface and the second surface in the non-rough surface region.

8. The method for producing a casing for a rotating machine according to claim 7, wherein in the rough surface region forming step, the rough surface region is formed by the laser light emitted from a laser marker device having a laser light output of 100 W or less.

9. A casing for a rotating machine configured such that a plurality of housings are linked to each other, the casing for a rotating machine comprising:
a first housing that includes a first connection part having a first surface extending along a radial direction of the rotating machine;
a second housing that includes a second connection part having a second surface extending along the radial direction and being in contact with the first surface; and
at least one fastening device that fastens the first connection part and the second connection part in an axial direction of the rotating machine,
wherein at least one of the first surface or the second surface includes a rough surface region in which a plurality of laser irradiation marks formed by irradiation with laser light are formed and a non-rough surface region in which the laser irradiation marks are not formed,
wherein the at least one fastening device includes
a first arcuate member that has a first fitting groove that is fitted to the first connection part and the second connection part from an outer side in the radial direction and extends along a circumferential direction of the rotating machine,
a second arcuate member that has a second fitting groove that is fitted to the first connection part and the second connection part from the outer side in the radial direction and extends along the circumferential direction of the rotating machine,
a rotation part configured to rotatably link one end portion of the first arcuate member and one end portion of the second arcuate member, and
a fastening part that fastens the other end portion of the first arcuate member and the other end portion of the second arcuate member,
wherein in a case where, regarding an angle position around an axis line of the rotating machine, a rotation center of the rotation part is set to 0° and an angle position α is defined such that an angle gradually increases toward the fastening part via the second arcuate member from the rotation part,
the rough surface region includes a rotation-part-side rough surface region formed within an first angle range satisfying a condition of $-60° \leq \alpha \leq 60°$,
wherein the non-rough surface region is configured not to be present in the first angle range, and
wherein the casing is configured such that when the first surface and the second surface are brought into close contact by a fastening force generated by the fastening device, a frictional resistance against positional deviation is generated in the rough surface region, and a continuous contact surface is formed between the first surface and the second surface in the non-rough surface region.

10. A casing for a rotating machine configured such that a plurality of housings are linked to each other, the casing for a rotating machine comprising:
a first housing that includes a first connection part having a first surface extending along a radial direction of the rotating machine;
a second housing that includes a second connection part having a second surface extending along the radial direction and being in contact with the first surface; and
at least one fastening device that fastens the first connection part and the second connection part in an axial direction of the rotating machine,
wherein at least one of the first surface or the second surface includes a rough surface region in which a plurality of laser irradiation marks formed by irradiation with laser light are formed and a non-rough surface region in which the laser irradiation marks are not formed,
wherein the at least one fastening device includes
a first arcuate member that has a first fitting groove that is fitted to the first connection part and the second connection part from an outer side in the radial direction and extends along a circumferential direction of the rotating machine,
a second arcuate member that has a second fitting groove that is fitted to the first connection part and the second connection part from the outer side in the radial direction and extends along the circumferential direction of the rotating machine,
a rotation part configured to rotatably link one end portion of the first arcuate member and one end portion of the second arcuate member, and
a fastening part that fastens the other end portion of the first arcuate member and the other end portion of the second arcuate member,
wherein in a case where, regarding an angle position around an axis line of the rotating machine, a rotation center of the rotation part is set to 0° and an angle position α is defined such that an angle gradually increases toward the fastening part via the second arcuate member from the rotation part,
the rough surface region includes a fastening-part-side rough surface region formed within an second angle range satisfying a condition of $120° \leq \alpha \leq 240°$,
wherein the non-rough surface region is configured not to be present in the second angle range, and
wherein the casing is configured such that when the first surface and the second surface are brought into close contact by a fastening force generated by the fastening device, a frictional resistance against positional deviation is generated in the rough surface region, and a continuous contact surface is formed between the first surface and the second surface in the non-rough surface region.

* * * * *